United States Patent
Volberg et al.

[11] Patent Number: 6,016,803
[45] Date of Patent: Jan. 25, 2000

[54] SELF-CONTAINED HYPERBARIC CHAMBER

[76] Inventors: Walter Volberg; Randall Volberg, both of #304 - 14981 101A Avenue, Surrey, British Columbia, Canada, V3R 0T1

[21] Appl. No.: 09/119,970

[22] Filed: Jul. 21, 1998

[51] Int. Cl.[7] .................................................. A61G 10/00
[52] U.S. Cl. ............................... 128/205.26; 128/202.12; 600/21
[58] Field of Search ......................... 128/202.12, 205.26, 128/204.18; 600/21; 96/4

[56] References Cited

U.S. PATENT DOCUMENTS

| | | | |
|---|---|---|---|
| 3,255,751 | 6/1966 | Bouet | 128/205.26 |
| 3,587,574 | 6/1971 | Mercer | 128/202.12 |
| 4,080,103 | 3/1978 | Bird | 128/204.18 |
| 4,106,504 | 8/1978 | York | 128/204.24 |
| 4,227,524 | 10/1980 | Galerne . | |
| 4,633,859 | 1/1987 | Reneau . | |
| 4,974,829 | 12/1990 | Gamow et al. . | |
| 5,082,471 | 1/1992 | Athayde et al. . | |
| 5,109,837 | 5/1992 | Gamow . | |
| 5,263,476 | 11/1993 | Henson . | |
| 5,327,904 | 7/1994 | Hannum . | |
| 5,398,678 | 3/1995 | Gamow | 128/205.26 |
| 5,582,574 | 12/1996 | Cramer | 600/21 |
| 5,611,845 | 3/1997 | Delp, II | 96/4 |
| 5,799,652 | 9/1998 | Kotliar | 128/205.11 |
| 5,950,625 | 9/1999 | Bongiovanni et al. | 128/845 |

*Primary Examiner*—John G. Weiss
*Assistant Examiner*—Todd Martin
*Attorney, Agent, or Firm*—Oyen Wiggs Green & Mutala

[57] ABSTRACT

This invention relates to a novel self-contained hyperbaric chamber. More particularly, this invention pertains to a hyperbaric chamber which contains all necessary gas processing equipment, conserves gas pressures and recovers oxygen from the waste gas. A self-contained hyperbaric chamber comprising: (a) a sealed gas chamber; (b) a first housing sealed from the sealed gas chamber; (c) a first air compressor within the first housing for withdrawing air from atmosphere and compressing the air for delivery to the interior of the sealed chamber; (d) a second housing sealed from the sealed gas chamber; and (e) a second compressor within the second housing for compressing air withdrawn from the interior of the sealed chamber and delivering the compressed air to an oxygen enriching molecular sieve and directing recovered oxygen enriched gas to the interior of the sealed chamber.

12 Claims, 5 Drawing Sheets

SELF-CONTAINED HYPERBARIC CHAMBER

FIELD OF THE INVENTION

This invention relates to a novel self-contained hyperbaric chamber. More particularly, this invention pertains to a hyperbaric chamber which contains all necessary gas processing equipment, conserves gas pressures and recovers oxygen from the waste gas.

BACKGROUND OF THE INVENTION

A hyperbaric chamber is conventionally used in the treatment of a variety of medical ailments by creating a high pressure environment in which a patient breathes a high concentration of oxygen. Hyperbaric chambers are used for a variety of medical purposes, including treating gangrene, decompression sickness and skin grafts. Since the patient is breathing a high concentration of oxygen, the healing process and healing times are purportedly improved. Conventional hyperbaric chambers usually include a pressure type compartment large enough to accommodate at least one person and a system for pressurizing the chamber. Typically, a patient in a hyperbaric chamber will breathe the same oxygen used to pressurize the chamber, or air is used to pressurize the chamber and oxygen is provided to the patient via a mask or hood assembly. Exhaled air which contains oxygen is exhausted from the hyperbaric chamber and is wasted. The oxygen is usually provided from a bank of high pressure oxygen cylinders located outside of the hyperbaric chamber. The oxygen is brought into the chamber through one or more tubes which penetrate the pressure containing wall of the hyperbaric chamber.

Conventional high pressure medical oxygen concentrators are usually limited to commercial installations where substantial floor space must be dedicated to supply a hospital's oxygen needs. Conventional high-pressure oxygen concentrators, cryogenic oxygen systems or banks of pressurized bottles are expensive, physically large and cumbersome, non-portable and require considerable maintenance. Conventional high-pressure oxygen concentrators are not suitable for domestic home market use because of their bulk, lack of portability and expense.

A number of patents have been granted over the years protecting various designs of hyperbaric chambers, and systems for handling oxygen-containing gases.

Gamow et al., U.S. Pat. No. 4,974,829, discloses a portable hyperbaric chamber. The chamber is designed for use by mountaineers and the like. The hyperbaric chamber consists of a balloon-like enclosure capable of maintaining a pressure from 0 to 10 psi above ambient. The device is pressurized by an air compressor 9 which delivers air into the interior of the enclosure. The oxygen content of internal air is replenished from a tank of compressed oxygen 13. Excessive carbon dioxide and water are removed by a chemical scavenger 10 through which internal air is circulated by a blower 11. Excess pressure is vented through an exit port 12 which optionally includes a differential pressure valve.

Gamow's second U.S. Pat. No. 5,109,837, is a continuation-in-part of the '829 Gamow patent. This patent discloses (see FIG. 6C) a hyperbaric chamber for treating a patient 610 which includes a closed-circuit oxygen scuba rebreather 611 for use in providing oxygen enriched air to the patient. As shown in FIG 6C, rebreather 611 appears to draw air from inside the hyperbaric chamber. Pressure inside the hyperbaric chamber is maintained by inflating the chamber with air from a compressed air tank 68. The patent specification notes that the compressed air tank could be replaced with a "pump operable by hand, foot, or other power source". Various other less relevant closed-circuit breathing systems are shown in the other drawings (for example, FIGS. 8, 9A and 9B).

Athayade et al., U.S. Pat. No. 5,082,471, discloses a shelter which includes a life support system. The shelter could be used, for example, to protect its inhabitants against a poison gas attack. The chamber includes a carbon dioxide removal unit which draws air from the interior of the chamber, passes the air through a scrubbing unit, and reintroduces the scrubbed air into the chamber. The carbon dioxide scrubbing unit may include a molecular sieve (see the last portion of column 5).

Reneau, U.S. Pat. No. 4,633,859, discloses a hyperbaric chamber in which an inert gas is used as a pressurized gas source 20A. A throttling valve 20C is connected between the gas source and the interior of the hyperbaric chamber. An outlet valve 20F allows gas to exhaust from the chamber. Pressure inside the chamber is controlled by actuating throttling valve 20C and valve 20F. Preferably, the pressure controller monitors the rate of pressure build-up after valve 20F has been closed and regulates valve 20C to hold pressure at a preset value (column 4, first paragraph). A patient inside the chamber breathes gas delivered from a pressurized oxygen source 40A and a pressurized air source 40B which are delivered into a mask 40I.

Galerne, U.S. Pat. No. 4,227,524, discloses a hyperbaric chamber system which includes means for transferring patients from one place to another. The hyperbaric chamber system includes fittings which pass into the chamber from outside for carrying oxygen 33 and compressed gas 37 into the hyperbaric chamber. A secondary detachable chamber is provided to allow a person to be transported to a medical facility. The transportable chamber includes a system for removing carbon dioxide and a dehumidification system. The dehumidification system may include a molecular sieve. Galerne does not give much detail about the operation of the $CO_2$ scrubber or the dehumidification system.

Hannum, U.S. Pat. No. 5,327,904, shows a small hyperbaric chamber which is pressurized with air. The air is pressurized by an air pump 13. The amount of air exiting the chamber is controlled by a chamber outflow control valve 37. It is not clear what role, if any, chamber outflow control valve 37 plays in regulating the pressure inside the hyperbaric chamber.

Henson, U.S. Pat. No. 5,263,476, discloses a sterile burn enclosure system which can be used to expose a patient to an atmosphere containing high concentrations of oxygen. The system includes means to control humidity, temperature and pressure within the enclosure. Oxygen is introduced into the enclosure from an external oxygen supply.

SUMMARY OF INVENTION

The invention is directed to a self-contained hyperbaric chamber comprising: (a) a sealed gas chamber; (b) a first housing sealed from the sealed gas chamber; (c) a first air compressor within the first housing for withdrawing air from atmosphere and compressing the air for delivery to the interior of the sealed chamber; (d) a second housing sealed from the sealed gas chamber; and (e) a second compressor within the second housing for compressing air withdrawn from the interior of the sealed chamber and delivering the compressed air to an oxygen enriching molecular sieve and directing recovered oxygen enriched gas to the interior of the sealed chamber.

Air delivered to the first compressor can pass through an air input filter. The compressed air can be passed through a heat exchanger for removing heat from the compressed air prior to being delivered to the interior of the sealed chamber. Air compressed by the first compressor can be passed through a moisture filter, a particle filter and a carbon filter before being directed to the interior of the sealed chamber.

Exhaust air withdrawn from the interior of the hyperbaric chamber can be compressed by the second air compressor, and passed through a heat exchanger to remove heat from the compressed air, before being passed through the molecular sieve for recovery of oxygen for delivery to the interior of the sealed chamber.

The hyperbaric chamber can include a second molecular sieve, air from the second air compressor being directed to the first molecular sieve and the second molecular sieve in alternating manner.

Computer controlled first and second feed valves, first and second waste gas valves, and equalization valves and equalization limiters can regulate air being directed alternatively to the first molecular sieve and the second molecular sieve.

Oxygen withdrawn from the first or second molecular sieve can be directed to a mixing tank, an oxygen pressure gauge, a product valve, a pressure regulator, a flow meter and an electronically controlled check valve before being directed to the interior of the hyperbaric sealed chamber.

The invention is also directed to a method of conserving oxygen and pressure of waste gas withdrawn from a hyperbaric chamber by directing the withdrawn waste gas under pressure to an oxygen recovery unit and recycling the oxygen enriched gas to the hyperbaric chamber. The oxygen recovery unit can be a molecular sieve and the waste gas withdrawn from the hyperbaric chamber can be compressed prior to being directed to the molecular sieve.

A pair of alternating molecular oxygen sieves and pressure regulators and valve systems can recover oxygen from the waste gas withdrawn from the hyperbaric chamber prior to recycling the gas to the hyperbaric chamber.

The method can include a pair of pressure regulators which together can provide a constant pressure differential on the molecular sieves at a prescribed differential pressure related to the pressure inside the hyperbaric chamber.

The invention also pertains to a method of maintaining oxygen concentration in the range 93 to 95% for breathing by a patient in a hyperbaric chamber by controlling the flow rate of oxygen recovered by recycling waste gas from the hyperbaric chamber through an oxygen recovery unit, said recovered oxygen being recycled to the hyperbaric chamber.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Hyperbaric oxygen therapy (HBOT) involves a patient breathing a high concentration of oxygen while in a chamber pressurized to greater than normal atmospheric pressure. Chambers in use range from single-person (monoplace) models, about seven feet long and about thirty inches in diameter, to multiplace chambers 12 feet in diameter by fifty feet in length. Monoplace chambers presently on the market obtain pressure from an external compressor and receive oxygen from pressurized cylinders attached to the chamber through an umbilical cord, and sent through a face mask. Some larger institutions have replaced these cylinders with industrial-sized oxygen generators through a piped system constructed within the hospital building. Some monoplace designs with small interiors pressurize the entire chamber with oxygen. Although this method eliminates the need for a compressor and electrical power, it requires a great deal more oxygen compared to compressor based systems, thus making treatments more expensive. In addition, this method is considered less safe due to the potential fire hazard it creates.

The conventional monoplace hyperbaric oxygen systems are inadequate for the following reasons:

(1) Oxygen Supply Dependency: The vast majority of hyperbaric oxygen treatment centers rely on the routine services of an oxygen tank supply company to replace empty oxygen cylinders with full oxygen tanks.

(2) Poor Availability: Routine supply of oxygen cylinders is not available in many remote locations.

(3) Space: At 2.5 atmospheres, each cylinder retains enough oxygen to supply from 1 to 3 individual treatments, each lasting approximately 90 minutes. (Variations result from differing methods of ventilation and flow rate). In order to provide treatment at a reasonable capacity, medical clinics typically need to physically accommodate a large number of oxygen cylinders to last from one delivery to the next delivery. Room for an external air compressor with appropriate noise insulation must also be provided.

(4) Expense: The routine delivery of fresh oxygen tanks is expensive. This cost contributes substantially to the over-head associated with conventional hyperbaric oxygen treatment.

In conventional hyperbaric oxygen chamber designs, waste gas inside the hyperbaric chamber still contains valuable oxygen but the oxygen containing waste gas is exhausted to ambient atmosphere. A second shortcoming of conventional hyperbaric chamber designs is that large differential pressures are encountered because fresh gas supplied to the hyperbaric chamber must be compressed from ambient atmosphere pressure to chamber pressure, which may be two or more atmospheres.

The hyperbaric chamber according to the invention comprises a self-contained oxygen rich gas chamber which typically operates in the range of 7.5 to 30 psig (0.5 to 2 atm). The concentration of oxygen breathed by the patient inside the chamber ranges between 93 and 95 percent. The hyperbaric chamber is a small readily portable sealed chamber which includes a pair of front and rear hollow seats, one for the patient receiving hyperbaric oxygen treatment, and the other for an attendant, if required. The hollow front and rear seats are sealed from the hyperbaric chamber and form cavities which are at ambient (room) pressure. The hyperbaric chamber is self-contained in that all operating equipment including the air compressor, associated valves, pressure gauges, alternating molecular sieves for oxygen, pressure regulators and the like, are held under the seats. The oxygen concentrator held in one of the cavities is at chamber pressure because the fittings for input and output a re connected to the chamber. An air compression system is held under a second seat.

One of the key inventive concepts that enables the hyperbaric chamber according to the invention to be self-contained is that gas pressures are conserved rather than being wasted by being exhausted to atmosphere. Furthermore, exhaust gas from the subject hyperbaric chamber is maintained at pressure, treated to recover valuable oxygen and is recycled to the chamber rather than having the valuable oxygen exhaust to atmosphere.

The utilization of existing waste gas pressure from the hyperbaric chamber according to the invention enables a much smaller air compressor to be used because differential pressures between the interior and the exterior of the chamber are dramatically reduced compared to the differential pressures that are typical in conventional hyperbaric oxygen chamber designs. Because existing gas pressure inside the subject hyperbaric chamber is conserved and reused, and thus a much smaller air compressor is required, it is possible to house the smaller air compressor, and auxiliary parts, under one of the sealed seats that are built into the hyperbaric chamber. Rather than being dumped to atmosphere, the oxygen rich waste or exhaust gas is withdrawn from the instant hyperbaric chamber and is directed through alternating molecular sieves which filter the oxygen and recycle it to the hyperbaric chamber. Reduced differential pressure across the molecular sieve beds has the added advantage that pulverization rates of the molecular sieve beads are reduced and molecular sieve bead life is prolonged. Furthermore, since pressure differentials are reduced, power requirements to operate the subject hyperbaric chamber are considerably lower than for conventional hyperbaric oxygen chambers.

The hyperbaric chamber according to the invention utilizes a novel combination of components to enable it to operate as a basically self-contained unit. Waste gas from the hyperbaric chamber is piped through an in-line muffler and into a small air compressor. It is then passed to the oxygen recovery molecular sieves. Pressure regulators monitor the pressure inside the hyperbaric chamber and regulate oxygen flow into the interior of the chamber by maintaining an equal differential pressure across the molecular sieves. This permits a steady, preset rate of oxygen to flow into a patient face mask held inside the hyperbaric chamber. The oxygen flow rate is unaffected by variable chamber pressure which can range from ambient to 2 atm. After oxygen has been filtered from the waste gas by the molecular sieves, the oxygen depleted gas is also returned to the hyperbaric chamber. This forms a closed loop, thereby maintaining valuable pressures and conserving energy requirements to drive the compressors. As an alternative, waste gas from the molecular sieves can be regulated by a back pressure regulator.

A further advantage of the instant hyperbaric chamber system is that the pressure differential on the molecular sieves can be maintained at a relatively constant level regardless of whether the gas pressure inside the hyperbaric chamber is at a pressure between ambient pressure and 2 atm.

Figure 1:
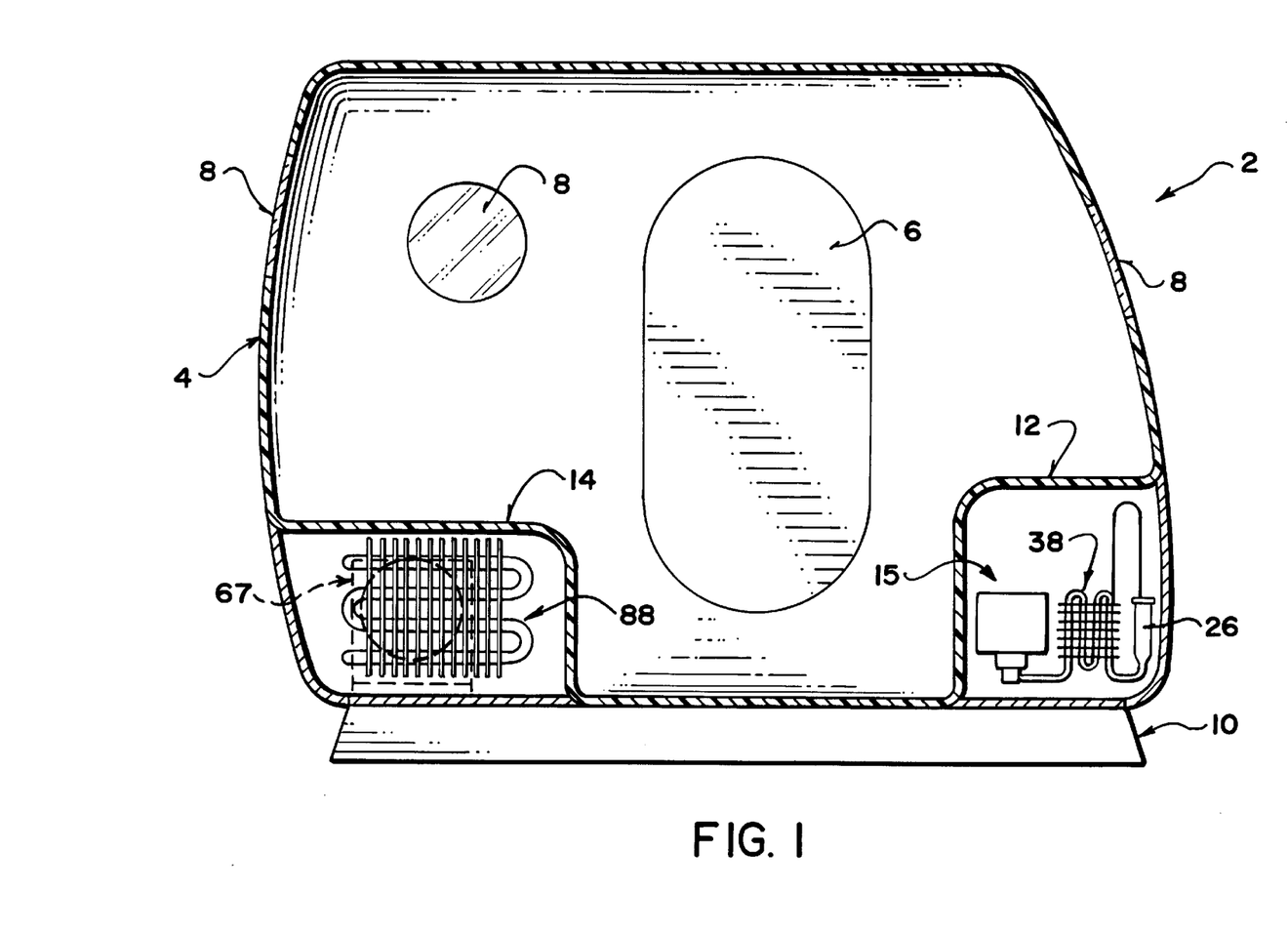
FIG. 1 illustrates an elevation partial section view of a hyperbaric chamber with self-contained air supply and oxygen recovery and compression systems.

Referring to the drawings, FIG. 1 illustrates an elevation partial section view of the self-contained hyperbaric chamber with self-contained air supply and oxygen recovery and compression systems. The hyperbaric chamber 2 comprises an airtight sealed chamber 4 with a door 6 on one side thereof. To avoid giving the susceptible patients a feeling of claustrophobia, and to enable attendants to look into the interior of the hyperbaric chamber 2, the hyperbaric chamber 2 has four port-hole type windows 8, one on each side. The hyperbaric chamber 2 is mounted on a base 10 which enables it to sit on a floor or any other location where the hyperbaric chamber 2 is installed. FIG. 1 also illustrates in section a sealed front seat 12 and a sealed rear seat 14, in which an oxygen recovery unit 15 and an air compression unit 67 are respectively located. This enables the hyperbaric chamber 2 to be totally self-contained.

Figure 2:
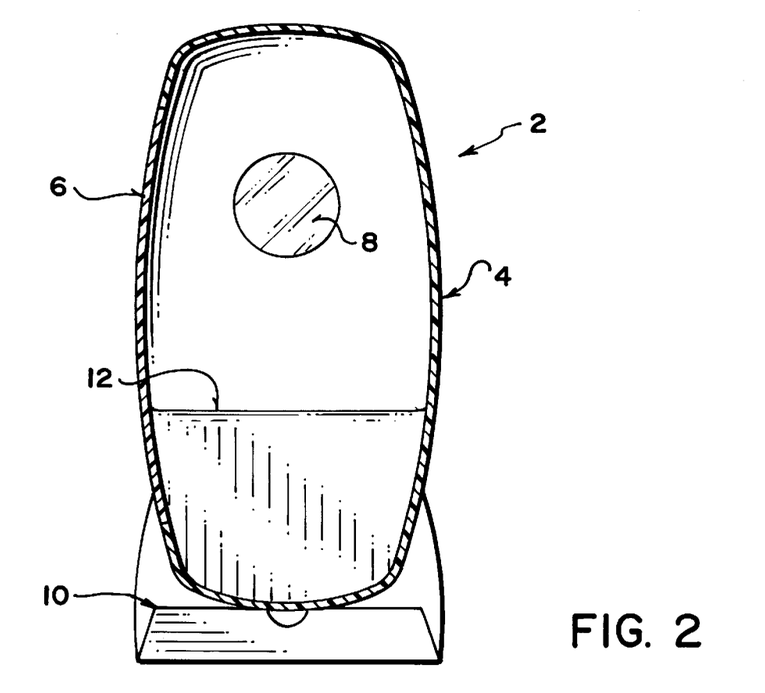
FIG. 2 illustrates an end view of the hyperbaric chamber.
Figure 3:
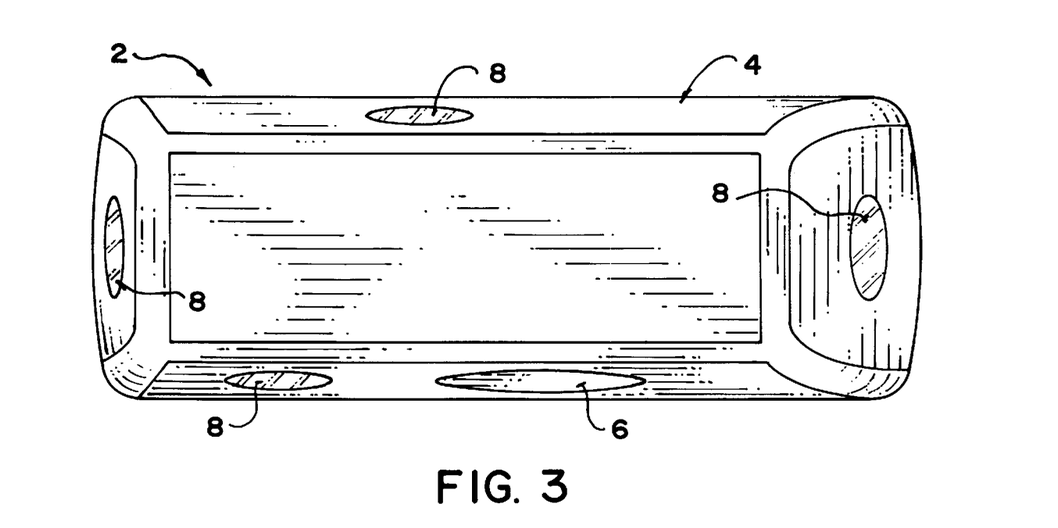
FIG. 3 illustrates a plan view of the hyperbaric chamber.

FIG. 2 illustrates an end view of the hyperbaric chamber 2 with the door 6 on one side thereof and a port-hole window 8 on one end thereof. The airtight chamber 4 is mounted on base 10. FIG. 3 illustrates a plan view of the airtight chamber 4 with the door 6 and four port-hole windows 8 on the four sides of the air chamber 4.

Figure 4:
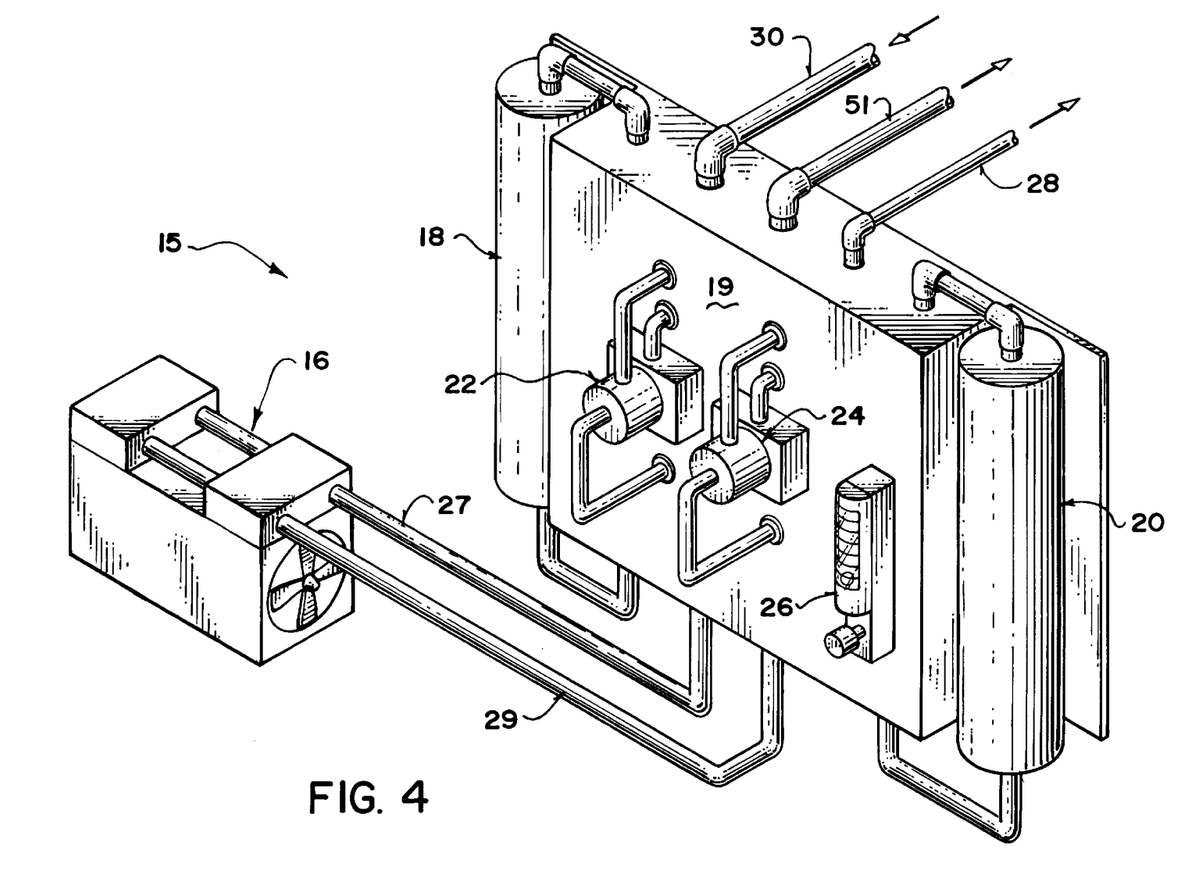
FIG. 4 illustrates an isometric view of the oxygen recovery and compression system.
Figure 5:
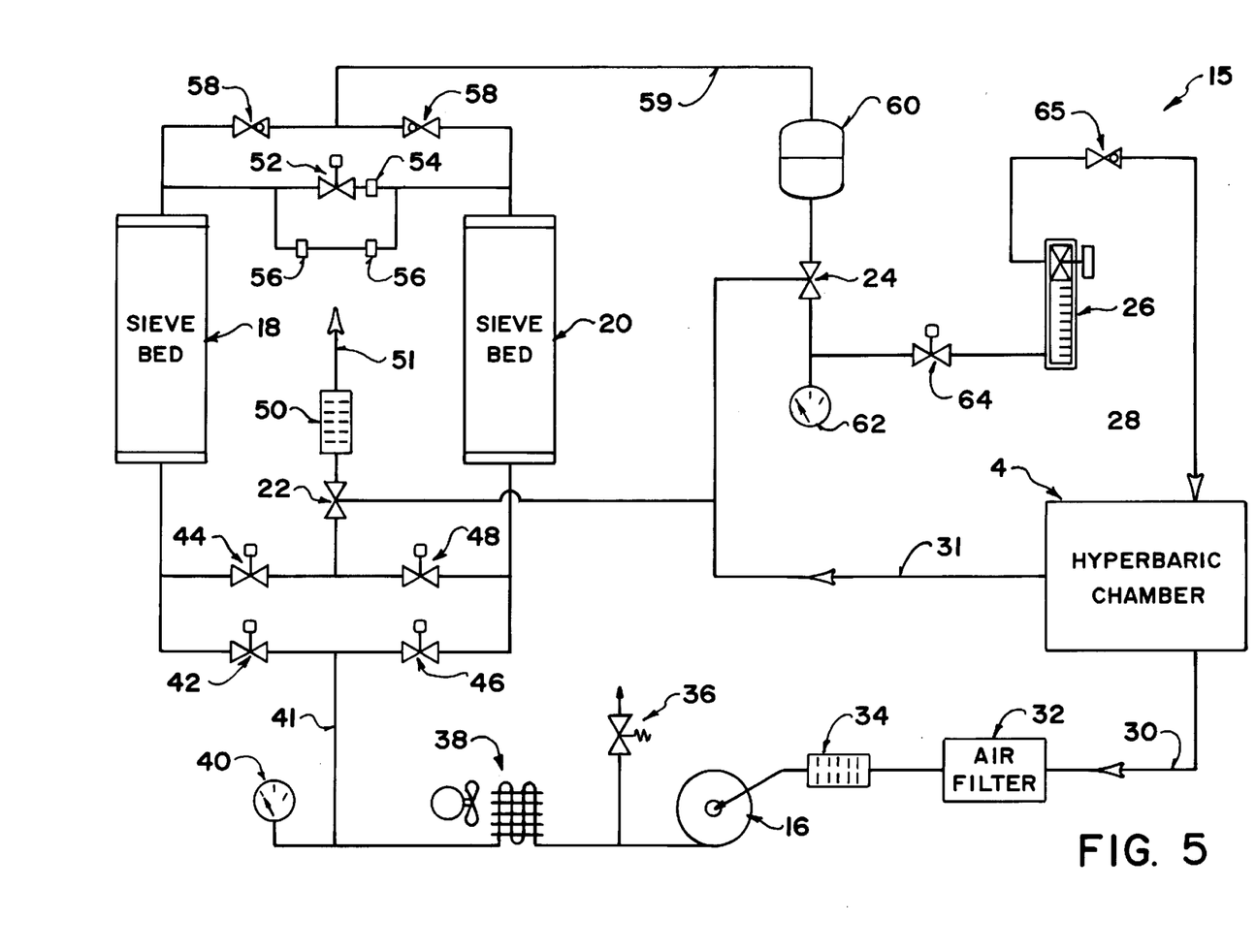
FIG. 5 illustrates a schematic diagram of the oxygen recovery and compression system.

FIG. 4 illustrates a simplified isometric view of the main components of oxygen recovery and compression system 15. The oxygen generating system as depicted isometrically in FIG. 4 is somewhat simplified in that all of the components illustrated in subsequent schematic flow sheet FIG. 5 are not illustrated. However, FIG. 4 illustrates the compressor 16, first molecular sieve 18 on one side, second molecular sieve 20 on the opposite side, exhaust regulator 22, oxygen regulator 24 and an oxygen flow meter 26 on the front face of housing 19. FIG. 4 also illustrates air supply line 28, which withdraws air from the interior of the hyperbaric airtight chamber 4, and oxygen supply line 30 which supplies recovered oxygen to the face mask worn by the patient (not shown). Air delivered to the compressor 16, and withdrawn from the compressor 16, is illustrated by pipe lines 27 and 29, and the directional arrows. A suitable compressor is manufactured and sold by Thomas Manufacturing, Model #2750 CFH 150.

FIG. 5 illustrates a schematic diagram of the oxygen recovery and compression system 15. As seen in FIG. 5, exhaust air, which still contains a reasonably high level of oxygen, for example, 20 to 21.9 percent, is withdrawn from the hyperbaric chamber via supply line 30 and is passed through air filter 32, and muffler 34, before reaching compressor 16 (which is also illustrated in FIG. 4). The compressor 16 compresses the air and then directs the compressed air through heat exchanger 38 in order to remove excess heat generated by the air compression process. Delivery of hot air to the molecular sieves 18 and 20 would damage them and delivery of hot air would be unbearable for the patient. An air intake cycle gauge 40 is positioned in the compressor outlet line 41.

Line 41 is then split into a left first air feed valve 42 and a right second air feed valve 46. The line network also includes a left first waste gas valve 44 and a right second air waste valve 48. The split enables the compressed air to be alternatingly directed to first molecular sieve 18 and second molecular sieve 20 where oxygen is concentrated. Once the oxygen enriched compressed air passes through the left molecular sieve 18 and/or the right molecular sieve 20, it passes through a series of units comprising an oxygen equalization valve 52, an equalization limiter 54, a pair of equalization limiters 56, and a pair of check valves 58, before being delivered through line 59 to a mixing tank 60. After the oxygen enriched gas passes through the mixing tank 60, it passes through an oxygen regulator 24, which maintains a preset positive differential pressure to the hyperbaric chamber. Oxygen enriched gas passes to oxygen pressure gauge 62, and computer controlled solenoid product valve 64, to oxygen flow meter 26. It then passes through a check valve 65, before being delivered to the interior of the hyperbaric chamber through supply line 28. Exhaust is vented through regulator 22 and muffler 50. Line 31 supplies instantaneous reference pressure to exhaust regulator 22 and oxygen regulator 24.

Figures 6, 7:
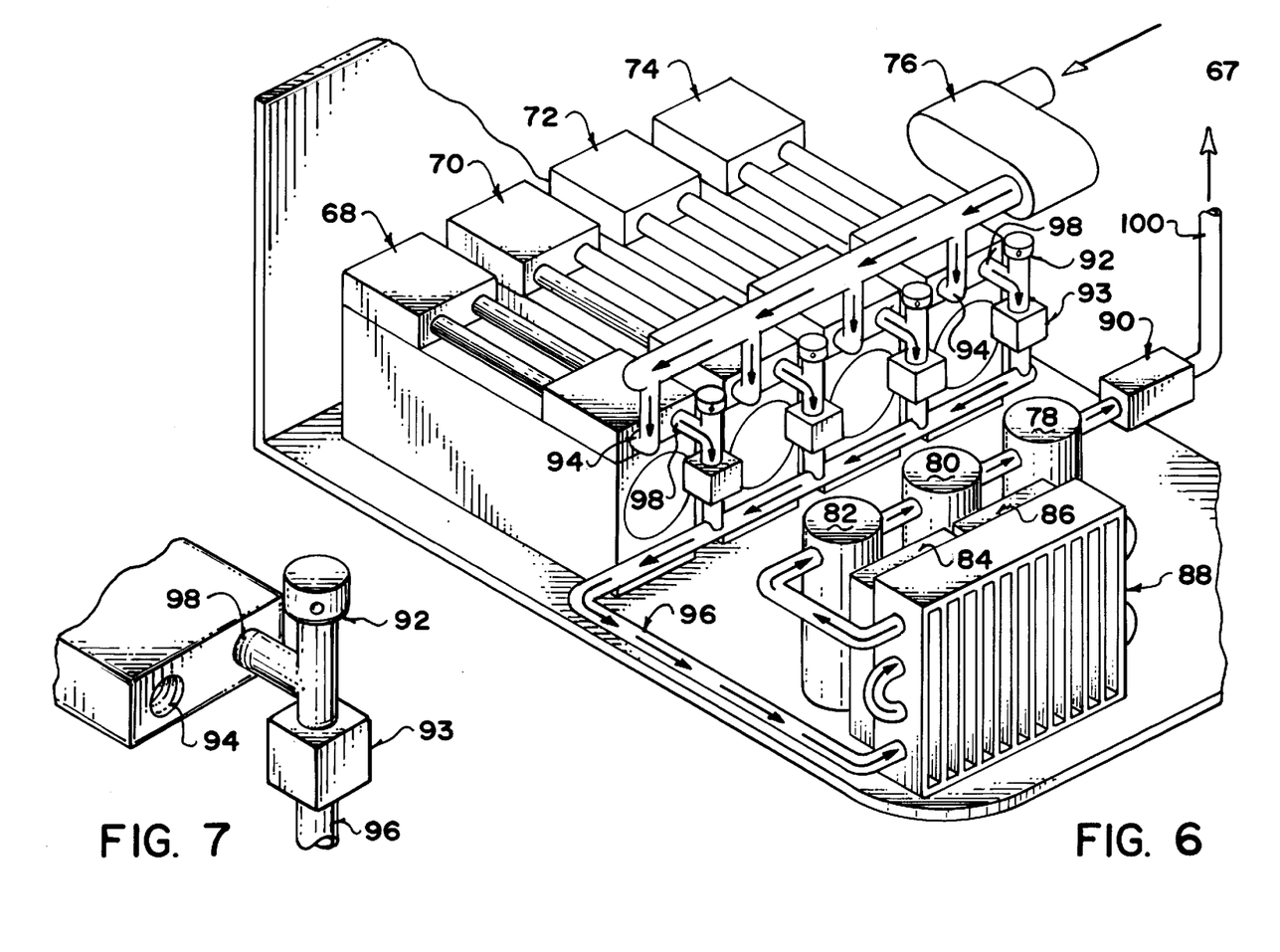
FIG. 6 illustrates an isometric view of the air compression system.
FIG. 7 illustrates an enlarged detailed view of the relief valve illustrated in FIG. 6.

FIG. 6 illustrates an isometric view of the main components of the air compression system. As depicted in FIG. 6, the air supply system 67 which is housed within hollow seat 14 (see FIG. 1) comprises four compressors 68, 70, 72 and 74 (Thomas Model #2750 CFH 150). It has been found that while one large air compressor can be used, maintenance costs are reduced and compressor lifetime is substantially increased by using four smaller air compressors as depicted in FIG. 6. Compressed air generated by the four compressors 68, 70, 72 and 74 passes in series through a moisture filter 82, a particle filter 80 and a carbon filter 78, to ensure that the compressed air being delivered to the interior of the chamber 4 is clean and wholesome. Prior to filtration, the compressed air is passed through a heat exchanger 88, which is cooled by a pair of cooling fans 84 and 86. The compressed air must be cooled before it is delivered to the interior of the chamber 4 in order to maintain temperatures within the chamber 4 at a comfortable level. Ambient air from outside the chamber 4 is drawn through ambient air filter 76 and passes to the four air compressors 68, 70, 72 and 74. The air compression system also includes a check valve 90. Individual relief valves 92 and check valves are associated with each compressor. The compressors are controlled by a programmable logic controller (PLC) and are turned on/off independently in order to vary the flow rate of fresh filtered compressed air flowing into the hyperbaric chamber.

Each compressor has its own ambient air inlet 94 in order for the air to be compressed. Hot air inlet 96 delivers air to the heat exchanger 88. Compressed air is withdrawn from each of the four compressors 68, 70, 72 and 74 through compressed air outlet 98. The compressed chamber air is then delivered to the interior of the hyperbaric chamber 4 through compressed chamber air line 100, which penetrates the sealed wall of the chamber 4.

FIG. 7 illustrates an enlarged detailed view of the relief valve 92, and compressed air outlet 98. While only one relief valve 92 is shown in FIG. 6, it will be understood that there are in fact four relief valves 92, one associated with each air compressor 68, 70, 72 and 74. It will also be understood that less than four or more than four air compressors can be used.

EXAMPLE

In developing a prototype a number of significant problems had to be solved:

(1) A method to utilize preferred small diameter beads in the molecular sieve beds, which have a tendency to break down under higher pressures, had to be devised.

(2) The compressor horsepower requirements and physical size had to be reduced to enable housing within the chamber.

(3) The oxygen flow rate had to be constant and automatically track with the varying pressures inside the hyperbaric chamber. Failure to do this could cause increased flow with reduced back pressures. If not controlled, this increased flow would reduce the oxygen percentage concentration to below minimum specifications.

A prototype has been constructed, operated and found to meet the following requirements:

(a) It generates 93 to 95% oxygen at 5 liters/min.

(b) It generates high-pressure oxygen to a maximum of 3 atmospheres absolute.

(c) It reduces bead pulverization in the pair of alternating molecular sieves.

(d) It has low annual maintenance requirements because large hard working compressors are not used.

(e) It is compact and fits into a reasonably small space.

(f) It has low power requirements because pressures are conserved.

(g) It has long life expectancy.

(h) It is lightweight.

The hyperbaric chamber according to the prototype takes advantage of the existing air pressure inside the chamber and utilizes this energy to supply oxygen in a compact and cost-effective way. Air from the hyperbaric chamber is piped through an inline muffler and into the input port of the compressor, which feeds the pair of molecular sieves. Special regulators monitor the interior chamber pressure and regulate the oxygen flow into the chamber by maintaining equal differential pressure. This permits a steady, preset flow rate of oxygen to flow into a face mask inside the chamber. Oxygen flow rate is unaffected by varying chamber pressure which can range from ambient to 3 atmospheres absolute.

The molecular sieve exhaust port waste gas as an option can be piped back into the chamber thereby forming a closed loop, or it can be regulated by special back-pressure regulator thereby giving the same effect. This procedure allows the pressure differential on the molecular sieves to be relatively constant regardless of whether the chamber is at ambient pressure or at 3 atmospheres absolute.

The oxygen concentrator in the prototype essentially floats with the chamber pressure, that is, the compressor input, the oxygen output and the exhaust are all relayed back into the hyperbaric chamber, or to circuits parroting the chamber conditions.

The hyperbaric chamber according to the prototype includes a pressure compartment large enough to accommodate the patient and optionally a second person and a system for pressurizing the compartment and recovering oxygen. The subject hyperbaric chamber includes apparatus for providing air enriched in oxygen to the patient inside the hyperbaric chamber. The apparatus draws pressurized waste air from inside the hyperbaric chamber, through an inlet, recovers oxygen from the waste air and recycles it without losing significant pressure. The chamber includes a pump which pumps the air through a molecular sieve to increase its oxygen concentration. The resulting oxygen enriched air is then recycled to the patient in the hyperbaric chamber by way of a face mask. Oxygen depleted exhaust air from the molecular sieve is also reintroduced into the hyperbaric chamber.

The hyperbaric chamber according to the prototype also controls pressure in the hyperbaric chamber. A compressor compresses air from outside of the hyperbaric chamber and delivers it under pressure control into the interior of the hyperbaric chamber. The pressure inside the hyperbaric chamber is controlled primarily by automatically adjusting a throttle valve on an outlet from the hyperbaric chamber. Opening the throttle valve decreases the pressure inside the hyperbaric chamber by bleeding off pressurized air from within the hyperbaric chamber. Closing the throttle valve increases the pressure within the hyperbaric chamber.

The monoplace hyperbaric chamber prototype is self-sustaining. The prototype replaces conventional external pressure and oxygen supply with a fully internalized pressurization and oxygen generating system. Oxygen in the waste gas is recovered by utilizing molecular sieve technology. The oxygen concentrator in the prototype provides a space efficient and economical new source of oxygen by extracting it directly from the exhaust gas and the surrounding air. Thus the prototype can provide a continuous flow of high concentration oxygen indefinitely, and is reliant only on electrical power to operate. (220V AC 60 Hz). (Other voltages such as 220V AC 50 Hz, single or three phase, etc. are possible.)

PROTOTYPE HYPERBARIC CHAMBER KEY COMPONENTS (a) Air Compressor

Four Thomas oil-less compressors, Model #2750CGH150, deliver 16 SCFM and pressurize the hyperbaric chamber. The compressor is housed in the back of the chamber underneath the sealed rear seat and outside the pressure wall of the chamber.

(b) Oxygen Concentrator

A modified and miniaturized oxygen generator is located at the front of the chamber underneath the sealed forward seat and outside the pressure wall. This on-site oxygen generating device with molecular sieve oxygen recovery utilizes air from inside the chamber and separates the oxygen from it. The separation is accomplished with an inert material that does not require replacement for five years. The process is completely regenerative which makes it reliable and virtually maintenance free. The oxygen delivery pressure can be set from 0 to 30 PSIG (0 to 207 kPa) and is adjusted to match the requirements of the facility using the hyperbaric chamber.

(c) Oxygen Sensor

The oxygen sensor measures the oxygen concentration inside the chamber. A corresponding control signal is sent to a programmable logic controller (PLC) for processing fresh air requirements for the chamber.

(d) Pressure Transmitter and Modulating Discharge Control Valve

A 4–20 mA loop powered two wire pressure transmitter monitors pressure inside the chamber. The pressure-signal is fed into the PLC. The PLC is a vital part to the various functions involved in operating the hyperbaric chamber and includes analog retransmission signals. Relay output modules control the air compressors 68, 70, 72, 74 and regulates the amount of makeup air and refresh air that enters the chamber. The pressure control signal is a retransmission signal which controls a modulating discharge valve and maintains the chamber at selected treatment pressure.

(e) Cooling: Heat Exchanger

One heat exchanger is used to cool the air exit the air compressor. Otherwise, temperatures inside the hyperbaric chamber can reach 200° F. The PLC automatically turns one or two cooling fans on as required to maintain temperature at a set point, usually about 70 to 80° F.

OPERATIONAL PROCEDURE

Makeup air is supplied during the treatment session. Minimum refresh air-flow requirement of 3 cu.ft./min. is subject to flow increases as determined by the oxygen concentration levels inside the chamber. The oxygen sensor output signal (4–20 mA) is calibrated to alarm $O_2$ levels at 19% for low and 23% for high oxygen levels. The PLC automatically turns on from one to four compressors to cause refresh airflow to increase in order to keep the oxygen concentration levels inside the chamber within the 19% to 23% oxygen level range. (The $O_2$ set-point is 20.9%).

A continuous supply of compressed air and oxygen is completely integrated into the hyperbaric chamber, thereby requiring only operating electrical power for the chamber to operate. The programmable controller (PLC) greatly simplifies overall performance and reduces operating time and vigilance. This avoids manual control which is considered to be less accurate for controlling the interaction among a variety of operating hardware and functions.

The PLC continuously receives data from various key sensors, gauges, and the like, and automatically controls: (a) compressed air generation; (b) air flow volume; (c) air flow temperature; (d) oxygen concentration; (e) chamber pressure; and (f) air discharge control The available space in the monoplace hyperbaric chamber is very limited and thus the miniaturization of all components is important. Four small compressors are used for the air pressure unit. These four small compressors are preferred to a single large compressor because loads on each are reduced and trouble free operation is dramatically extended.

The oxygen concentrator also utilizes a small compressor and heat exchange unit, as well as other key components as shown in FIG. 5. The air intake line is connected directly to the chamber. As the chamber pressure rises, the pressure in the air intake line rises correspondingly to the pressure in the chamber. The exhaust from the $O_2$ Concentrator is connected back into the chamber through a check valve. By connecting the $O_2$ Concentrator in this fashion the device is now "floating" at the chamber pressure and allows high pressure oxygen to be generated using a low pressure device.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A self-contained hyperbaric chamber comprising:
   (a) a sealed gas chamber;
   (b) a first housing sealed from the sealed gas chamber;
   (c) a first air compressor within the first housing for withdrawing air from atmosphere and compressing the air for delivery to the interior of the sealed chamber;
   (d) a second housing sealed from the sealed gas chamber; and
   (e) a second compressor within the second housing for compressing air withdrawn from the interior of the sealed chamber and delivering the compressed air to an oxygen enriching molecular sieve and directing recovered oxygen enriched gas to the interior of the sealed chamber.

2. A hyperbaric chamber as claimed in claim 1 wherein air delivered to the first compressor passes through an air input filter.

3. A hyperbaric chamber as claimed in claim 2 wherein the compressed air from the first compressor is passed through a heat exchanger for removing heat from the compressed air prior to being delivered to the interior of the sealed chamber.

4. A hyperbaric chamber as claimed in claim 2 wherein air compressed by the first compressor is passed through a moisture filter, a particle filter and a carbon filter before being directed to the interior of the sealed chamber.

5. A hyperbaric chamber as claimed in claim 1 wherein exhaust air withdrawn from the interior of the hyperbaric chamber is compressed by the second air compressor, and passed through a heat exchanger to remove heat from the compressed air, before being passed through the molecular sieve for recovery of oxygen for delivery to the interior of the sealed chamber.

6. A hyperbaric chamber as claimed in claim 5 including a second molecular sieve, air from the second air compressor being directed to the first molecular sieve and the second molecular sieve in alternating manner.

7. A hyperbaric chamber as claimed in claim 6 wherein computer controlled first and second feed valves, first and second waste gas valves, and equalization valves and equalization limiters regulate air being directed alternatively to the first molecular sieve and the second molecular sieve.

8. A hyperbaric chamber as claimed in claim 7 wherein oxygen enriched air withdrawn from the first or second molecular sieve is directed to a mixing tank, an oxygen pressure gauge, a product valve, a pressure regulator, a flow meter and an electronically controlled check valve before being directed to the interior of the hyperbaric sealed chamber.

9. A method of conserving oxygen and pressure of waste gas withdrawn from a hyperbaric chamber by directing the withdrawn gas under pressure to an oxygen recovery unit comprising a molecular sieve and recycling oxygen enriched gas to the hyperbaric chamber, wherein the waste gas which is withdrawn from the hyperbaric chamber is compressed prior to being directed to the molecular sieve.

10. A method as claimed in claim 9 wherein a pair of alternating molecular oxygen sieves and pressure regulators and valve systems recover oxygen from the waste gas withdrawn from the hyperbaric chamber prior to recycling the gas to the hyperbaric chamber.

11. A method as claimed in claim 10 including a pair of pressure regulators which together provide a constant pressure differential on the molecular sieves at a prescribed differential pressure related to the pressure inside the hyperbaric chamber.

12. A method as claimed in claim 9 of maintaining oxygen concentration in the range 93 to 95% in the hyperbaric chamber by controlling the flow rate of oxygen recovered by recycling waste gas from the hyperbaric chamber through the oxygen recovery unit, said recovered oxygen being recycled to the hyperbaric chamber.

\* \* \* \* \*